United States Patent [19]
Blase et al.

[11] Patent Number: 5,169,242
[45] Date of Patent: Dec. 8, 1992

[54] TURBOCHARGER ASSEMBLY AND STABILIZING JOURNAL BEARING THEREFOR

[75] Inventors: James L. Blase, Lemont, Ill.; Steven A. Klusman, Indianapolis, Ind.; James E. Korenchan, Burr Ridge, Ill.

[73] Assignee: General Motors Corporation, Detroit, Mich.

[21] Appl. No.: 619,315

[22] Filed: Nov. 27, 1990

[51] Int. Cl.$^5$ .......................... F16C 27/00; F16C 32/06
[52] U.S. Cl. ..................................... 384/99; 384/107; 384/114
[58] Field of Search ........... 384/99, 100, 107, 114–120

[56] References Cited

U.S. PATENT DOCUMENTS

| | | |
|---|---|---|
| 2,953,416 | 9/1960 | Collins et al. |
| 3,738,717 | 6/1973 | Gardner. |
| 3,811,741 | 5/1974 | McInerney et al. |
| 4,366,994 | 1/1983 | Yoshioka ............................... 384/99 |
| 4,428,689 | 1/1984 | Choate. |
| 4,527,912 | 7/1985 | Klusman ............................... 384/99 |
| 4,602,873 | 7/1986 | Izumi et al. .......................... 384/99 |
| 4,605,316 | 8/1986 | Utecht .................................. 384/99 |
| 4,719,818 | 1/1988 | McCreary ......................... 74/750 R |
| 5,020,923 | 6/1991 | Heitz et al. .......................... 384/99 |

FOREIGN PATENT DOCUMENTS

| | | |
|---|---|---|
| 1535174 | 6/1968 | France. |
| 908567 | 10/1962 | United Kingdom. |
| 950762 | 2/1964 | United Kingdom. |

OTHER PUBLICATIONS

Gunter, E. J., Barrett, L. E., and Allaire, P. E., "Design and Application of Squeeze Film Dampers for Turbomachinery Stabilization", no date.
Gunter, E. J., Barrett, L. E., and Allaire, P. E., "Design of Nonlinear Squeeze-Film Dampers for Aircraft Engines", Jan. 1977.
Gunter, E. J., Li, D. F., and Barrett, L. E., "Unbalance Response of a Two Spool Gas Turbine Engine with Squeeze Film Bearings", Jan. 1981.
Gunter, E. J., "Rotor-Bearing Stability", no date.
Allaire, P. E., and Flack, R. D., "Design of Journal Bearings for Rotating Machinery", Dec. 1981.
Criqui, A. F., "Advancements in Centrifugal Gas Compressor Stability", no date.
Salamone, D. J., "Introduction to Hydrodynamic Journal Bearings", no date.
Salamone, D. J., "Journal Bearing Design Types and Their Applications to Turbomachinery", no date.
Hylton, P. D., Klusman, S. A., and Trippet, R. J., "Optimization of Supercritical Rotor System for the T406 Engine", 1988.
San Andres, L. A., and Vance, J. M., "Experimental Measurement of the Dynamic Pressure Distribution in a Squeeze Film Bearing Damper Executing Circular Centered Orbits", no date.
Goodwin, M. J., and Roach, M. P., "Vibration Control in Rotating Machinery Using Variable Dynamic Stiffness Squeeze-Films", Aug. 1985.

*Primary Examiner*—Thomas R. Hannon
*Attorney, Agent, or Firm*—Robert J. Outland

[57] ABSTRACT

An engine turbocharger, particularly of the two cycle diesel type for railway locomotives and other applications, has a rotor with an overhung compressor supported by a compressor journal bearing and thrust flange combination. The bearing combines a multi (two) lobed offset cylindrical wedge film inner surface with a close clearance squeeze film outer surface that causes the bearing to float laterally in a support member to damp shaft runout while supporting the rotor on load controlling oil wedges. The fixed flange provides thrust control and provides a loose pin connection with the bearing that prevents rotation while permitting its squeeze film damping lateral motion. Particular pressure lubrication provides oil to the bearing interior and exterior adequate for the oil wedge supporting and squeeze film damping functions.

18 Claims, 3 Drawing Sheets

TURBOCHARGER ASSEMBLY AND STABILIZING JOURNAL BEARING THEREFOR

TECHNICAL FIELD

This invention relates to fluid dynamic machines, especially turbochargers for internal combustion engines, particularly two cycle diesel engines, and to rotor support bearings, especially for stabilizing rotation of a rotor journal, particularly a compressor support journal.

BACKGROUND

It is known in the art relating to high speed rotor applications, such as in gas turbine engines, turbochargers and the like that dynamic unbalance generates vibrations during rotor rotation which may be controlled or damped by squeeze film type dampers. Examples of such dampers in combination with anti-friction type bearings are described in U.S. Pat. No. 4,527,912 Klusman issued Jul. 9, 1985 to the assignee of the present invention.

In the art relating to relatively heavy duty diesel engines, particularly two cycle diesel engines of the type produced by the Electro-Motive Division of General Motors Corporation and used extensively in diesel-electric railway locomotives and numerous other applications, the use of overrunning gear driven turbochargers is also known. Some such embodiments are described and/or referred to in U.S. Pat. No. 4,719,818 McCreary issued Jan. 19, 1988 to the assignee of the present invention. In an embodiment described in this patent, the turbocharger rotor 14 is supported on lobed sleeve bearings, not numbered, including a compressor bearing supporting a journal between the turbine wheel 15 and an overhung compressor wheel 16. Such compressor bearings have included a sleeve having five tapered (offset cylindrical) internal lobes and an integral spherical thrust flange, the sleeve being fixed in the turbocharger housing. Pressure oil is supplied to the bearing through feed grooves at the deeper edges of wedge shaped oil spaces formed by the lobes.

The five tapered lobe sleeve bearing with integral thrust flange has given many hours of satisfactory service in turbochargers of the type described in U.S. Pat. No. 4,719,818. However, it has been found through extensive testing that the dynamics of the turbocharger rotor with its overhung compressor limit bearing life in operation under some operating conditions involving synchronous critical speeds, resonances and subsynchronous instabilities such as "oil whirl" and "oil whip".

SUMMARY OF THE INVENTION

The present invention provides a bearing design applicable to this and similar rotor applications which takes into account the rotor dynamics referred to above and acts to eliminate or limit their effects on the bearing of the turbocharger rotor on which it is applied. A fixed thrust flange is made as a separate member which is connected to a separate sleeve bearing by a loose pin that serves only to prevent rotation of the bearing while allowing it freedom for limited lateral motion.

The sleeve bearing uniquely combines the features of an offset cylindrical lobed hydrodynamic interior bearing configuration with an exterior configuration adapted to provide squeeze film oil damping effects. The bearing is mounted loosely but with close clearance within the compressor support portion of the bearing housing and is fed with pressurized oil which acts as a damping fluid to eliminate oil whirl subsynchronous instability. The squeeze film damping features of the bearing are designed in accordance with known squeeze film damping characteristics as disclosed in the previously mentioned U.S. Pat. No. 4,527,912 but the present application to a hydrodynamic sleeve bearing as well as the oil feed and other features of the invention are believed to be unique.

In preferred form, the sleeve bearing also utilizes a two lobed offset cylindrical interior configuration which further increases the rotor stability by reducing the spring rate of the compressor bearing, thereby reducing the critical speed and dynamic energy of the rotor and eliminating the adverse effects of synchronous resonance.

These and other features and advantages of the invention will be more fully understood from the following description of certain embodiments of the invention taken together with the accompanying drawings.

BRIEF DRAWING DESCRIPTION

DETAILED DESCRIPTION

Figure 1:
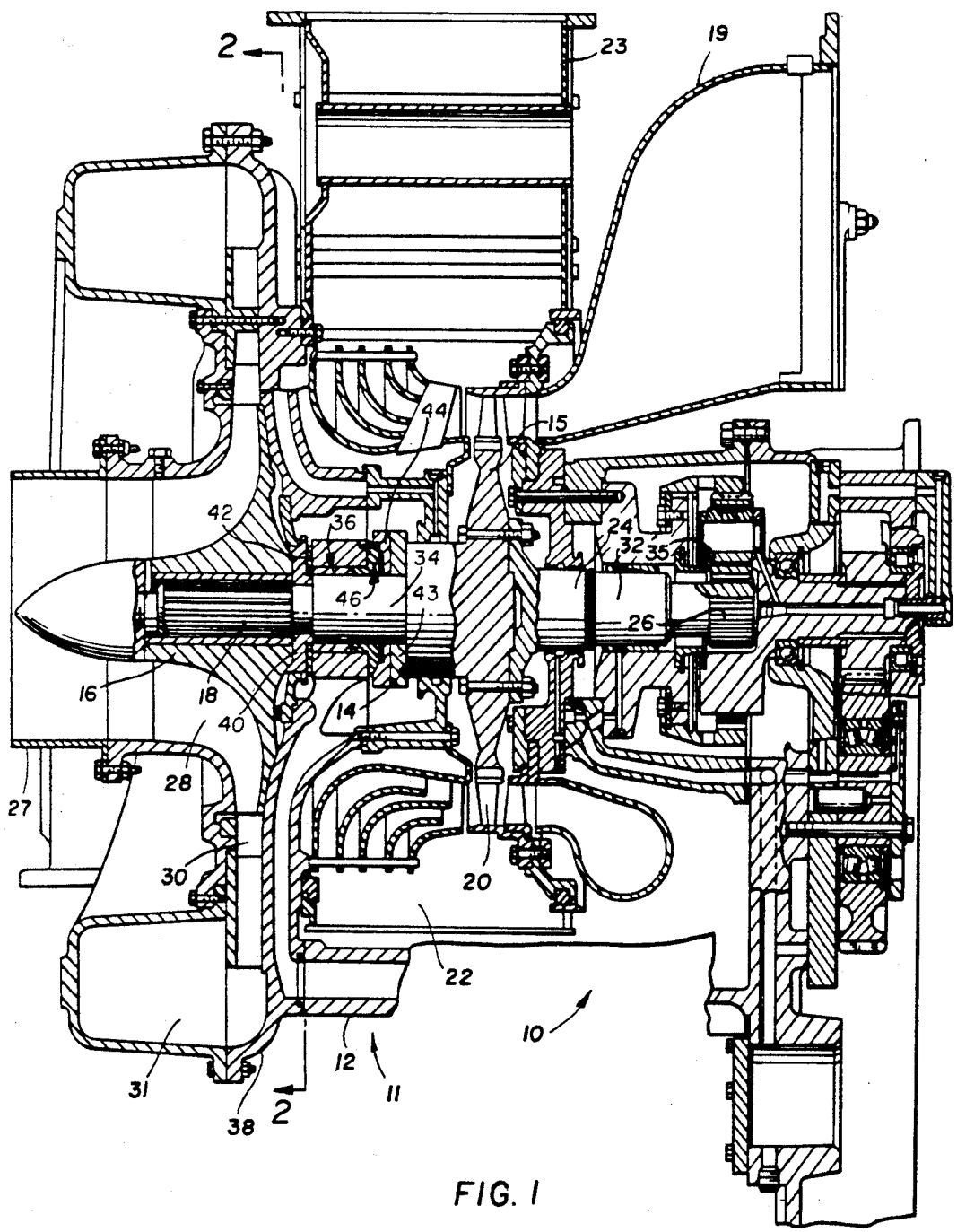
FIG. 1 is a vertical cross-sectional view through a turbocharger having rotor bearing means according to the invention.

Referring now to the drawings in detail, numeral 10 generally indicates a turbocharged two stroke cycle medium speed diesel engine, particularly of the railway locomotive type previously referred to. The engine 10 has a fabricated crankcase, not shown, at the rear of which there is mounted a gear and exhaust gas driven turbocharger generally indicated by numeral 11.

The turbocharger 11 includes a housing 12 supporting a rotor 14 that includes a turbine wheel 15 and a compressor wheel 16 mounted on a common shaft 18 that is preferably made integral with the turbine wheel. The turbine wheel 15 is driven by exhaust gases discharged from the engine cylinders, not shown, and directed through an inlet duct and scroll 19 against blades 20 on the turbine wheel, where a portion of the exhaust energy is utilized for turning the rotor. The exhaust gases are then received in a collector chamber 22 and discharged through an exhaust duct 23.

The rotor 14 further includes a drive shaft 24 fixed to the turbine wheel 15 at one end and having a sun gear 26 at its other end that is part of a planetary gear set in a gear train for driving the rotor when the exhaust energy is insufficient for the purpose. Further description of a gear train similar to that shown may be found in the aforementioned U.S. Pat. No. 4,719,818.

Rotation of the rotor 14 turns the compressor wheel 16, drawing in ambient air through an inlet duct 27 to rotating blades 28 on the compressor wheel, where the air is compressed. The compressed inlet air is then discharged through a diffuser 30 to an outlet scroll 31 from which it is carried by duct means, not shown, to the engine cylinders. The rotor 14 is rotatable on a pair of bearing journals 32, 34, located on opposite sides of the turbine wheel, between it and the overhung sun gear 26 and compressor wheel 16, respectively. The journals are respectively carried in a gear end bearing 35 and a compressor sleeve bearing 36, the latter comprising a primary element of the present invention.

Figure 2:
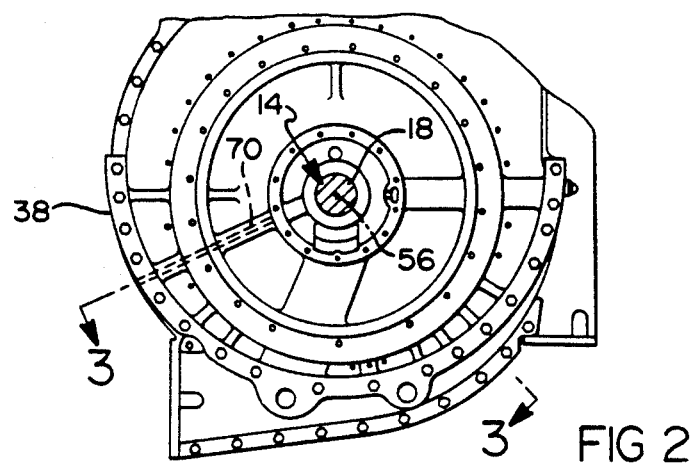
FIG. 2 is a transverse cross-sectional view generally along the line 2—2 of FIG. 1 and showing the thrust flange end of the compressor bearing support.

Bearing 36 is supported in a compressor bearing support member 38 which is a separate part of the housing 12 and also forms a portion of the outlet scroll 31. A turbine end view of the bearing support 38 is shown in FIG. 2.

Figure 3:
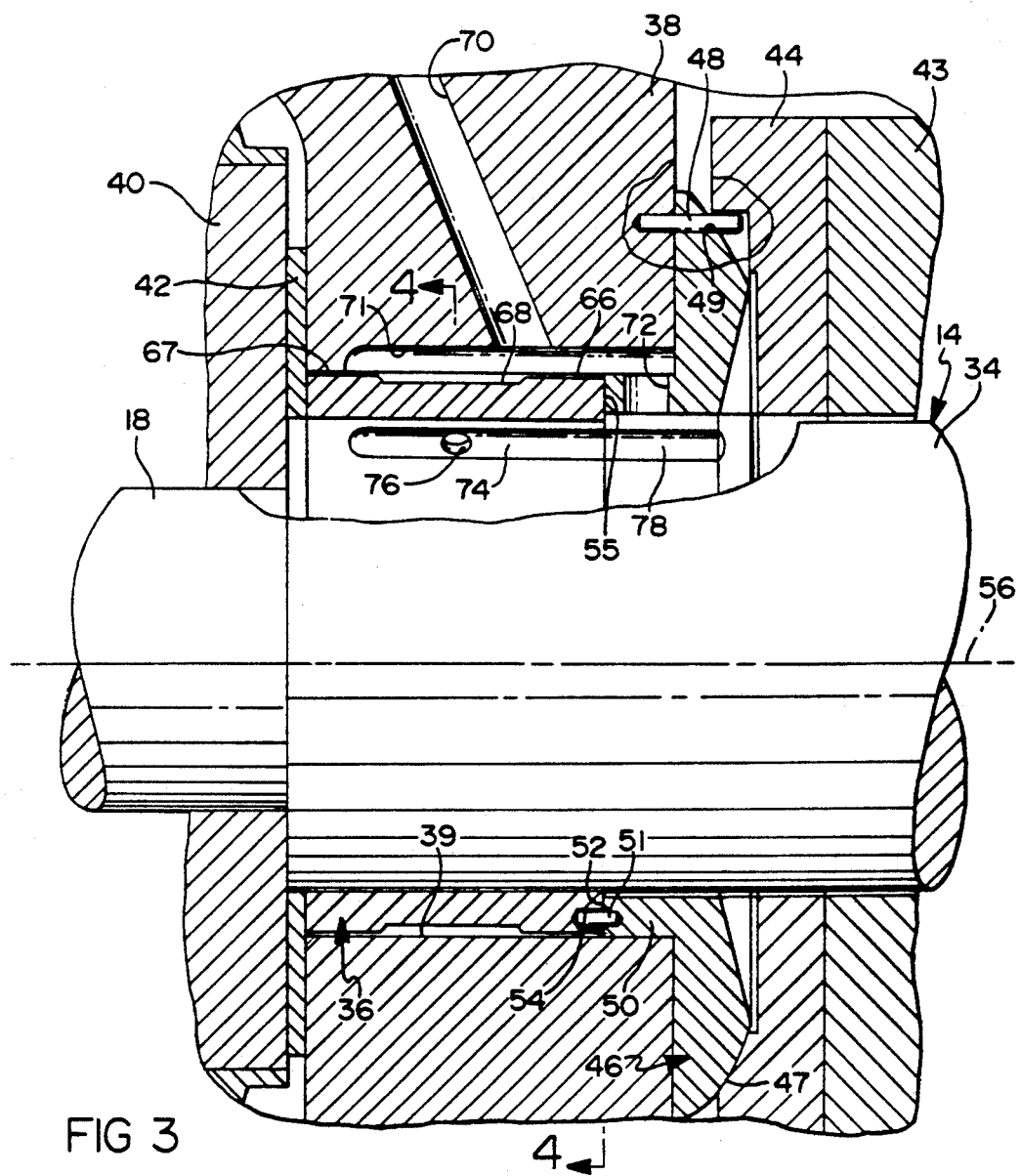
FIG. 3 is an enlarged cross-sectional view along the line 3—3 of FIG. 2 showing certain features of the rotor bearing assembly, support and oil feed means according to the invention.

Portions of the turbocharger immediately adjacent to the compressor bearing 36 are best shown in FIG. 3. The journal 34 of the rotor shaft 18 extends through a machined bore 39 of the support member 38. Adjacent the journal, a smaller extension of the shaft 18 carries a spacer ring 40 that rotates with the shaft. To control (rightward) axial motion of the shaft and rotor, ring 40 bears against an anti-thrust washer 42 that is fixed to the support member 38. Motion in the primary direction of thrust (leftward) is prevented by a rotor carried thrust flange 43 that bears against a thrust bearing 44.

The bearing 44 is in turn supported axially by a flange member 46 having a spherical surface 47 that engages a mating surface of the thrust bearing 44. The flange member seats against the end of the bearing support member 38 which carries a pin 48 extending through an opening 49 in the flange member 46 into a slot in the thrust bearing 44 to prevent its rotation. A short annular extension 50 of the inner portion of the flange member 46 extends into the support member bore 39 to abut the end of the sleeve bearing 36. The extension 50 is press fitted within the bore 39 so that rotation and lateral motion of the flange member 46 are prevented but the inner diameter of the flange member is spaced with a large clearance from the shaft journal 34 to allow for the free circulation of oil.

As distinguished from the prior arrangement shown in U.S. Pat. No. 4,719,818 where the compressor bearing and spherical flange are formed together as a single member, the bearing 36 and flange 46 of the present invention are made as separate abutting elements. However, rotation of the sleeve bearing 36 is prevented by a guide pin 51 that is pressed into an opening in the end 52 of the flange extension 50 and extends loosely into a guide opening 54 in the abutting end 55 of the bearing 36.

Figure 4:
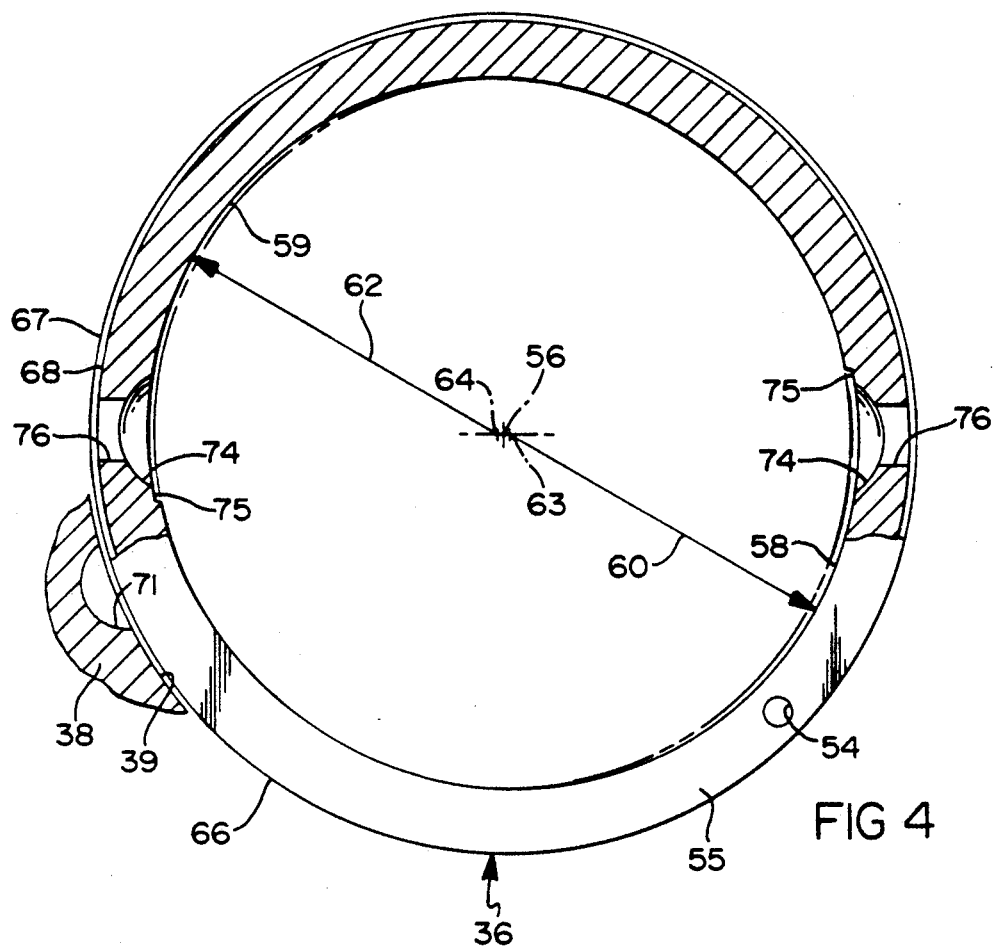
FIG. 4 is a transverse cross-sectional view along the line 4—4 of FIG. 3 showing features of the bearing and support.
Figure 5:
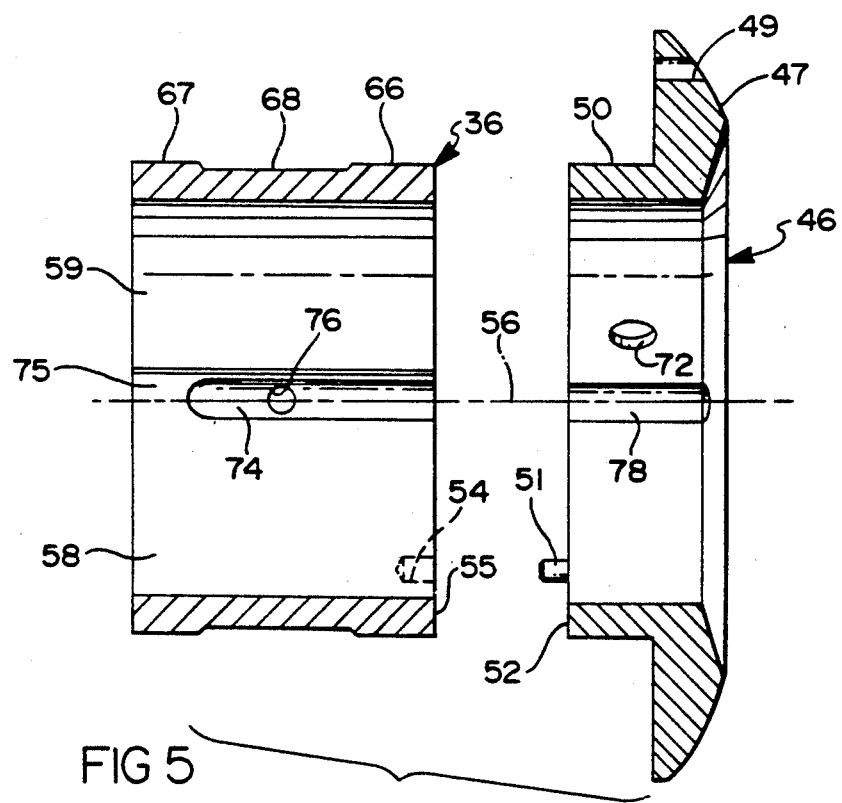
FIG. 5 is a longitudinal cross-sectional view of the related flange and sleeve bearing elements shown in axially displaced positions but showing their circumferential alignment and orientation as installed.

As is best seen in FIGS. 4 and 5, the compressor sleeve bearing 36 of the present invention is of generally cylindrical configuration centered on a longitudinal axis 56. The interior surface is primarily made up of two laterally offset cylindrical lobes 58, 59 formed from radii 60, 62 drawn, respectively, from axes 63, 64 that are slightly offset (e.g. a few thousandths of an inch) on opposite sides of the primary axis 56. The offsetting dimensions in the FIG. 4 are shown greatly enlarged for clarity. The offset cylindrical lobes 58, 59 are dimensioned in accordance with known hyrodynamic bearing technology to support the weight of the associated rotor shaft on converging wedges of oil formed by rotation of the shaft in the clockwise direction as seen in FIGS. 2 and 4. While a greater number of wedge forming bearing lobes could be used if desired, the illustrated embodiment with two lobes provides a somewhat softer lateral support while retaining vertical stiffness which improves stability while reducing oil whirl and bearing loads.

The outer surface of the sleeve bearing 36 is comprised of a plain cylindrical surface centered on the primary axis 56 and including a pair of spaced annular surfaces 66, 67 separated by a relatively wide and shallow groove 68. This outer surface is formed to define, with the associated bore 39 in which it is installed, a squeeze film damper generally of the type described in the previously mentioned U.S. Pat. No. 4,527,912. Thus, the surfaces 66, 67 are sized to have a small clearance from the bore 39 when centered therein as shown enlarged in FIG. 3. This clearance is preferably about equal with the anticipated maximum runout of the shaft over the operating speed range of the rotor. Further, the shallow groove is preferably dimensioned to extend between $\frac{1}{2}$ and $\frac{3}{4}$ the length of the bearing damper portion and to have a depth of not less than twice the clearance between the annular surfaces 66, 67 and the associated bore 39. These features are in accordance with the practices recommended in the U.S. Pat. No. 4,527,912.

Among the differences in the present invention from the prior arrangements is the combination of a lobed, especially two-lobed, offset cylindrical hydrodynamic bearing with an external squeeze film damper for controlling dynamic loads of a rotating shaft assembly. The lubrication of the combined hydrodynamic squeeze film bearing to provide adequate oil supply to both portions involves features of further difference from the previous applications of squeeze film dampers to anti-friction bearings for example. Further, the manner of guiding the bearing 36 with a pin held in the associated flange member provides additional distinction.

To support the rotor shaft and provide the desired squeeze film damping of rotor dynamics the bearing 36 must be provided with a substantial flow of pressurized oil to both inner and outer surfaces of the bearing. This is accomplished by providing oil system pressure to a passage 70 that connects with a single feed groove 71 in the support member 38. The groove 71 extends axially along one side of the bore 39 to communicate with the groove 68 in the bearing 39 and with a radial hole 72 through the extension 50 of the flange member 46. In the illustrated embodiment, an additional hole 72 is provided at the diametrically opposite position which serves no immediate function but is needed only if it is desired to rotate the position of the flange member during subsequent overhaul of the turbocharger.

In addition, a pair of oil grooves 74 are provided in the interior of the bearing 36, extending axially along opposite sides of the bearing as installed in deeper end portions 75 of the lobes that form thicker ends of the oil wedges in operation. These grooves 74 are preferably communicated with the bearing grooves 68 by feed holes 76 drilled radially through the bearing shell. Open ends of the grooves 74 also communicate with mating grooves 78 extending axially across the inner surface of the flange member 46 and its extension 50.

In operation, pressurized oil is fed through the passage 70 to the feed groove 71. Some of this oil is fed to the shallow groove 68 which distributes it to the squeeze film annulus around the exterior of the bearing 39. This provides a cushion of oil on which the bearing tends to float with vibration of the shaft being damped by the lateral motions of the sleeve bearing 36 continually squeezing the oil film from the areas of decreasing clearance to the distant areas of increasing clearance and across the surfaces 66, 67 to the bearing ends. This lateral sleeve bearing motion is permitted by the loose fitting pin 51 which engages the guide opening 54 with clearance that prevents bearing rotation without limiting lateral motion.

Some of the squeeze film oil is also delivered to the interior of the bearing 39 through the feed holes 76 to lubricate the bearing interior. This flow of oil must be taken into consideration in the design of the squeeze film damper as it provides a path for movement of the squeezed out oil which is in addition to the annular and axial paths along the bearing exterior.

A large volume of oil from the groove 71 is also delivered through the radial hole 72 to the enlarged clearance between the journal 34 and the inner diameter of the flange member 46. This oil not only feeds the thrust bearing 44 but also flows into the flange member grooves 78 and to the sleeve bearing mating grooves 74, providing the hydrodynamic bearing 36 with adequate oil to develop the oil wedges for supporting the rotating shaft. While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A turbocharger assembly comprising
   a housing,
   a rotor having a shaft carrying a compressor wheel and connected with a turbine wheel and drive means,
   bearing means rotatably supporting the rotor on either side of the turbine and including a stabilizing bearing adjacent to but inboard of the compressor wheel,
   said bearing including a lobed inner surface for developing a plurality of stabilizing wedge oil films for supporting the shaft and a cylindrical outer surface maintained in closely spaced free floating relation with cooperating portions of said housing to provide, when supplied with pressurized oil, a squeeze film effect for damping lateral motion of the shaft, wherein said bearing inner surface has only two lobes positioned opposite one another on the inner surface.

2. A turbocharger assembly as in claim 1 and further comprising means for delivering pressurized lubricant to both the inner and outer surfaces of said bearing.

3. A turbocharger assembly comprising
   a housing,
   a rotor having a shaft carrying a compressor wheel and connected with a turbine wheel and drive means,
   bearing means rotatably supporting the rotor on either side of the turbine and including a stabilizing bearing adjacent to but inboard of the compressor wheel,
   said bearing including a lobed inner surface for developing a plurality of stabilizing wedge oil films for supporting the shaft and a cylindrical outer surface maintained in closely spaced free floating relation with cooperating portions of said housing to provide, when supplied with pressurized oil, a squeeze film effect for damping lateral motion of the shaft,
   a flange member fixed in said housing and including a tubular portion and a radial flange portion, the tubular portion abutting one end of said bearing, and
   means loosely connecting said tubular portion of the flange member with said bearing one end to prevent rotation of the bearing while allowing lateral motion of the bearing within the housing.

4. A turbocharger assembly as in claim 3 and further including lubrication means for delivering pressurized lubricant to both the inner and outer surfaces of said bearing, said lubrication means including
   a distribution groove in the housing and communicating with the exterior of said bearing and said tubular portion of the flange member,
   a radial hole in the tubular portion and communicating the distribution groove with the interior of the tubular portion, said interior portion having a substantial clearance from the shaft to promote the free flow of lubricant, and
   oil feed grooves in the bearing interior and communicating the oil in said clearance with the bearing interior.

5. A turbocharger assembly as in claim 4 wherein said bearing further includes feed holes from the feed grooves to the bearing exterior to allow some direct oil flow therebetween.

6. A turbocharger assembly as in claim 3 wherein said connecting means comprises a guide portion protruding from one of abutting ends of the tubular portion and the bearing into loose connection with abutment means in the other of said abutting ends.

7. A turbocharger assembly as in claim 6 wherein said abutment means comprises a guide opening and said guide portion comprises a pin secured in said one end and extending loosely into said guide opening.

8. A sleeve bearing for supporting and stabilizing rotation of a turbocharger rotor, said bearing being of generally cylindrical configuration and including
   an exterior squeeze film surface comprising a pair of spaced annular surfaces of equal diameter separated by an annular feed area of slightly smaller diameter than the spaced surfaces for collecting pressurized oil between the annular surfaces, and
   a lobed interior surface comprising a single pair of opposed ramp-like arcuate segments having spaced centers slightly offset from the sleeve axis to form, when installed, opposed wedge oil spaces around a cooperating bearing journal and an axial oil feed groove in each segment adjacent the deeper end thereof forming the thicker portion of the respective oil wedge space.

9. A sleeve bearing as in claim 8 and further including a feed hole from each of the feed grooves to the annular feed area of the exterior surface to allow oil flow therebetween.

10. A sleeve bearing as in claim 8 wherein the feed grooves open to one axial end of the bearing to provide for oil supply to the interior surface from said bearing end.

11. A sleeve bearing as in claim 8 and further including a guide opening on one axial end of the bearing for loosely receiving a rotation preventing guide pin.

12. A sleeve bearing as in claim 10 wherein the feed grooves open to one axial end of the bearing to provide for oil supply to the interior surface from said bearing end, said one axial end having a guide opening for loosely receiving a rotation preventing guide pin.

13. A sleeve bearing as in claim 12 and further including a feed hole form each of the feed grooves to the angular feed area of the exterior surface to allow oil flow therebetween.

14. A sleeve bearing as in claim 13 wherein the depth of the shallow groove is at least twice the thickness of the clearance between the spaced annular surfaces of the bearing exterior and a bore in which the bearing is designed to be installed for operation.

15. A sleeve bearing as in claim 8 wherein said annular feed area comprises a shallow groove having an axial length between ⅛ and ⅝ of the total length of said exterior squeeze film surface.

16. A stabilizing bearing for supporting in a housing a turbocharger rotor adjacent to a compressor wheel of the rotor, said bearing including a two-lobed inner surface for developing a pair of opposed stabilizing wedge oil films for supporting the shaft and a cylindrical outer surface maintained in closely spaced free floating relation with cooperating portions of said housing to provide, when supplied with pressurized oil, a squeeze film effect for damping lateral motion of the shaft, a flange member fixed in said housing and including a tubular portion and a radial flange portion, the tubular portion abutting one end of said bearing, and means loosely connecting said tubular portion of the flange member with said bearing one end to prevent rotation of the bearing while allowing lateral motion of the bearing within the housing.

17. A stabilizing bearing as in claim 16 wherein said connecting means comprises a guide portion protruding from one of abutting ends of the tubular portion and the bearing into loose connection with abutment means in the other of said abutting ends.

18. A stabilizing bearing as in claim 17 wherein said abutment means comprises a guide opening and said guide portion comprises a pin secured in said one end and extending loosely into said guide opening.

* * * * *